N. H. MOTSINGER.
ROTARY GAS ENGINE.
APPLICATION FILED SEPT. 30, 1910.

1,168,099.

Patented Jan. 11, 1916.
4 SHEETS—SHEET 3.

Witnesses
C. H. Reichenbach.
L. A. Price

Inventor
Newell H. Motsinger,
By E. W. Bradford
Attorney

N. H. MOTSINGER.
ROTARY GAS ENGINE.
APPLICATION FILED SEPT. 30, 1910.

1,168,099.

Patented Jan. 11, 1916.
4 SHEETS—SHEET 4.

Witnesses
C. H. Reichenbach.
L. A. Price.

Inventor
Newell H. Motsinger,
By E. W. Bradford
Attorney

UNITED STATES PATENT OFFICE.

NEWELL H. MOTSINGER, OF GREENSBURG, PENNSYLVANIA.

ROTARY GAS-ENGINE.

1,168,099.　　　　　　Specification of Letters Patent.　　Patented Jan. 11, 1916.

Application filed September 30, 1910. Serial No. 584,722.

*To all whom it may concern:*

Be it known that I, NEWELL H. MOTSINGER, a citizen of the United States, residing at Greensburg, in the county of Westmoreland and State of Pennsylvania, have invented certain new and useful Improvements in Rotary Gas-Engines, of which the following is a specification.

The object of my said invention is to provide an improved construction of rotary gas engines comprising a series of rotors formed with intermeshing vanes and grooves and embodying an arrangement of parts whereby the force of expansion is directed in opposite directions to turn said rotors and balance the strain upon the parts, all as will be hereinafter more fully described and claimed.

Figure 1:
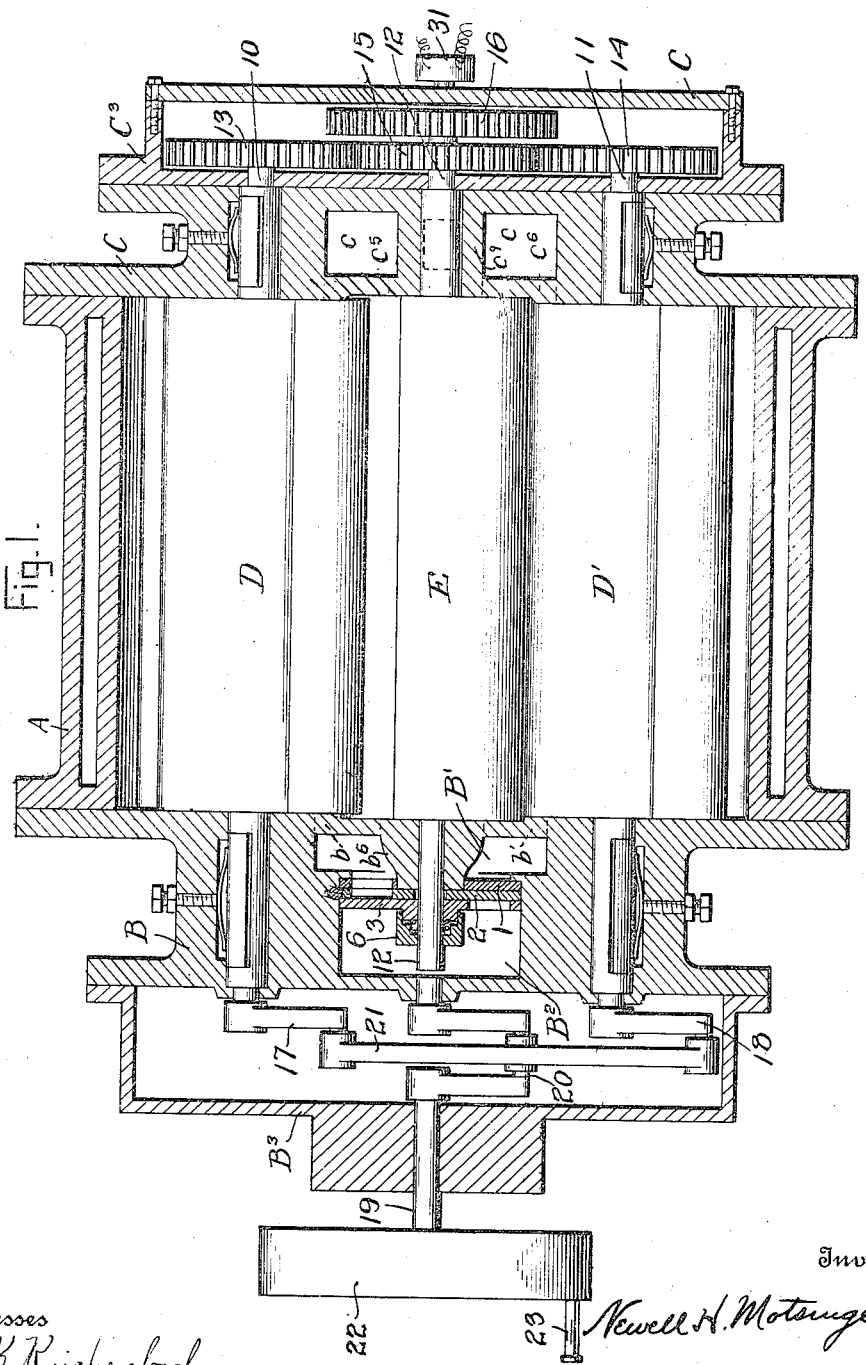
Figure 2:
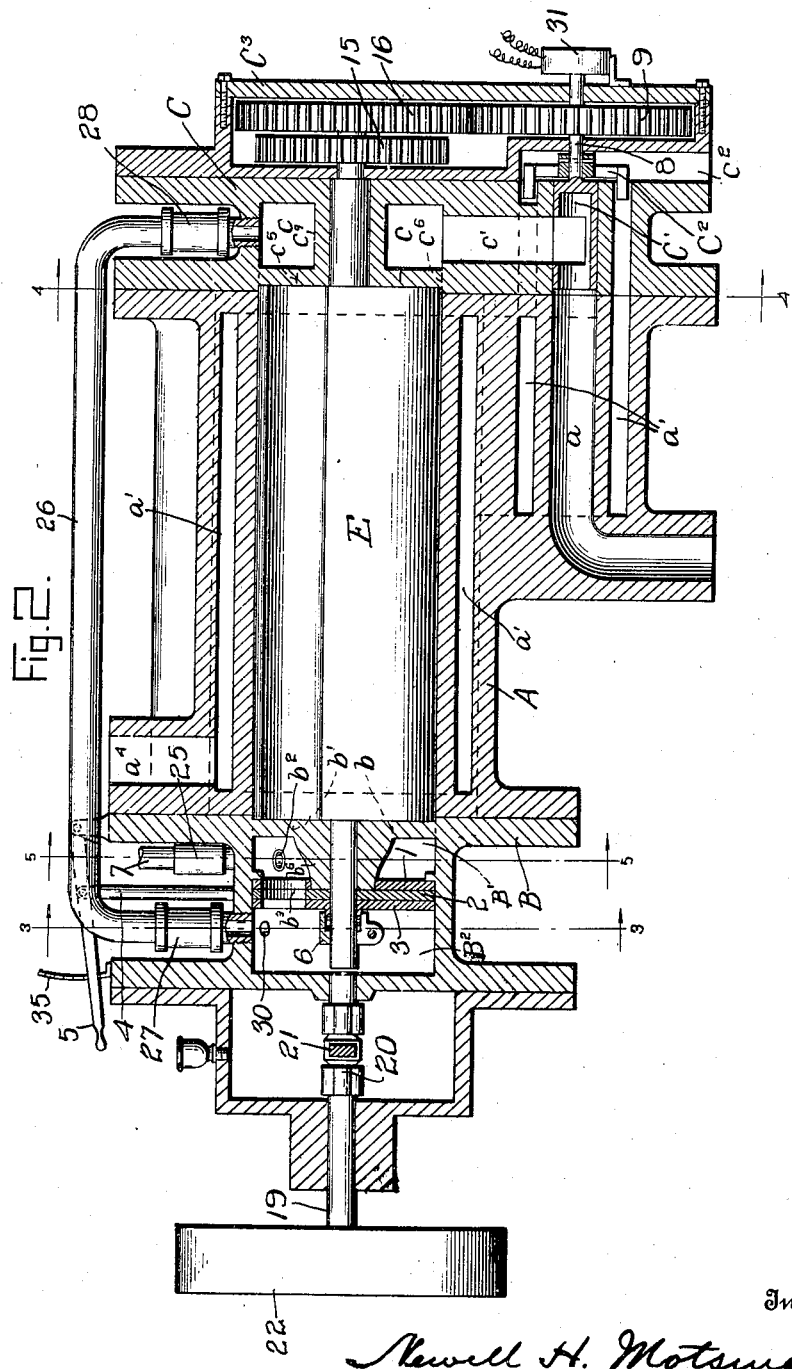
Figure 3:
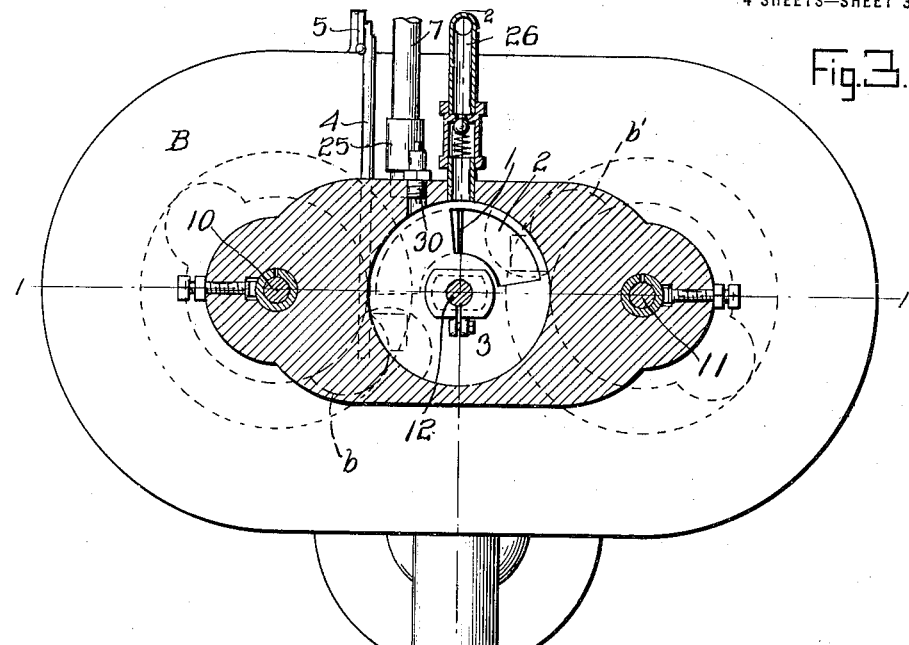
Figure 4:
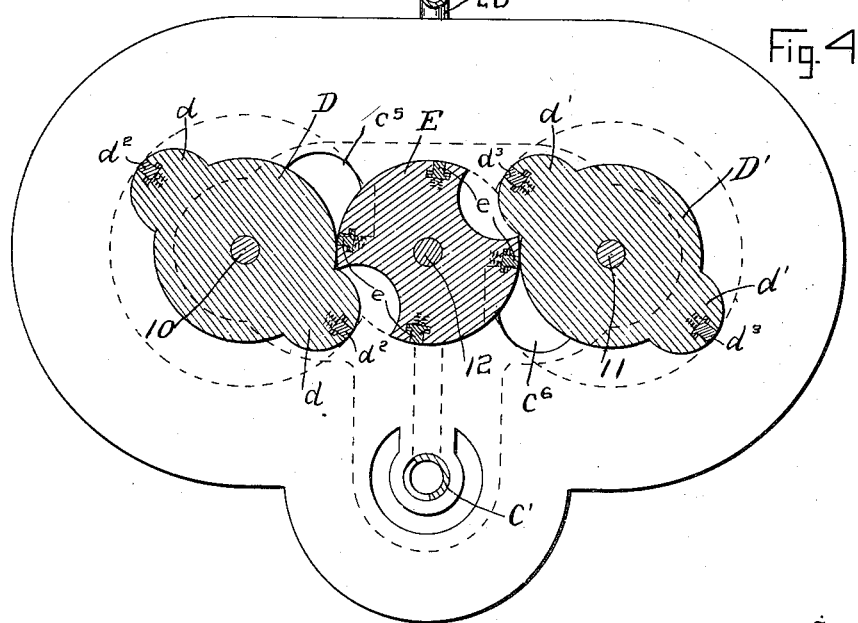
Figure 5:
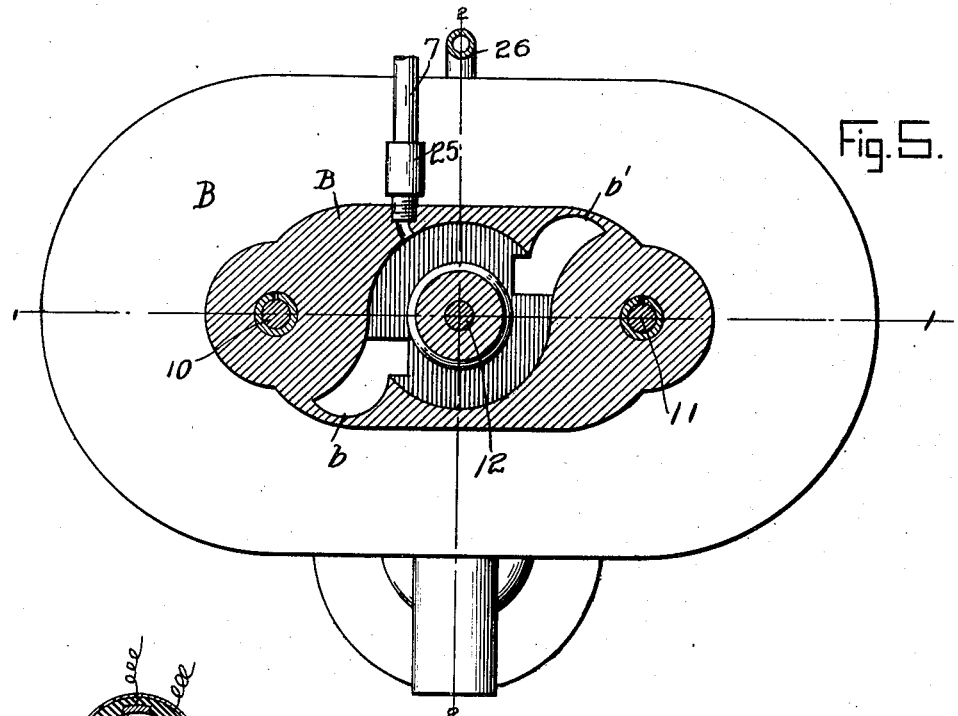
Figure 7:
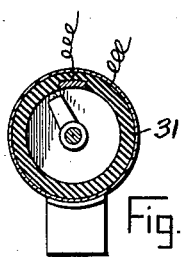
Figure 6:
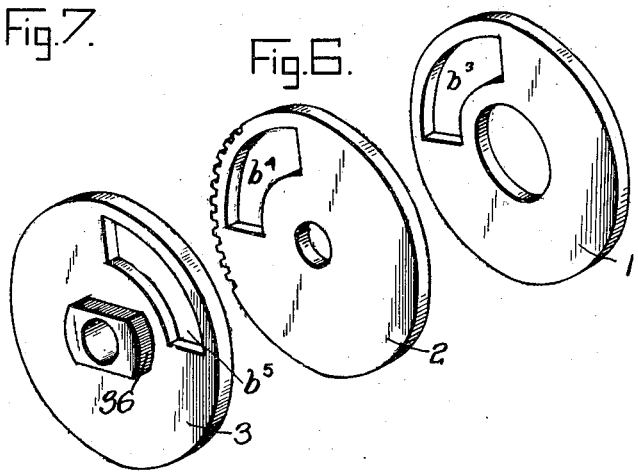

Referring to the accompanying drawings which are made a part hereof, and on which similar reference characters indicate similar parts, Figure 1 is a horizontal section through an engine of my improved construction on the dotted line 1—1 in Figs. 3 and 5, Fig. 2 a vertical section through the same on the dotted line 2—2 in Figs. 3 and 5, Fig. 3 a cross section as seen when looking in the direction indicated by the arrows from the dotted line 3—3 in Fig. 2, Fig. 4 a cross section as seen when looking in the direction indicated by the arrows from the dotted line 4—4 in Fig. 2, Fig. 5 a cross section on the dotted line 5—5 in Fig. 2, Fig. 6 a perspective view of the plates forming the separation between the firing chamber and the inner feeding chamber, and Fig. 7 a detail view showing the "interrupter," or "timer" of the sparker mechanism.

In said drawings the portions marked A represent the cylinder, or casing, B and C the respective heads thereto, D and D' the side rotors and E the central rotor.

The casing A is a suitable casting formed with three longitudinal bores in a horizontal plane centrally arranged to receive the rotors and with a third bore $a$ in the lower side of the casing, forming the exhaust port of the engine. A channel $a'$ is cored out in said casting surrounding the several bores, through which air, water, or some other cooling agent, may be forced for keeping the engine cool.

The head B is a casting of appropriate form fitted and bolted to one end of the casing A and containing bearings for the shafts of the several rotors. It is cored out to form a chamber B' adjacent to the ends of the rotors and another chamber $B^2$ in its outer end. Said chambers B' and $B^2$ are separated by three plates 1, 2 and 3. Plate 1 is fixed around the outer end of the boss $b^6$ in the casting forming the bearing for the central rotor, or may be formed as a web in the casting itself. It is formed with a segmental port or aperture $b^3$ in one side. Plate 2 is formed with a similar port $b^4$ and is mounted to oscillate, being formed with teeth on one edge (see Fig. 6) with which a vertical sliding rack-bar 4 engages, said rack-bar being connected to an operating lever 5 by means of which the position of said plate may be adjusted. Said lever is pivoted in a standard appropriately mounted on the casing and has an edge adapted to engage notches in the side of a notched standard 35 adjacent thereto for supporting it in the desired adjustment. Plate 3 is connected to the shaft of the central rotor by means of an exterior hub, or boss 36, of oblong shape, which engages loosely with a similarly shaped recess in the adjacent side of a collar 6 fixed upon said shaft. A slight movement is allowed between said parts to permit the plate 3 to adjust itself against the face of plate 2 and prevent their close contact from being interrupted by the vibration of said shaft, a stiff coiled spring being interposed between said collar and hub for the purpose of preventing undue independent movement. From the chamber B' ports $b$ and $b'$ lead into the chambers containing the outside rotors D and D'. A supply pipe 7 from the oil supply leads into chamber B' through an opening $b^2$.

The segmental aperture, or port, $b^4$ in plate 2 is of a form substantially the same as the form of the port $b^3$ through plate 1, as shown most clearly in Fig. 6. By turning said plate 2, by means of rack-bar 4 and lever 5, it will be seen that the length of the slot, or port, through the partition formed by the plates 1 and 2 can be regulated as desired. Plate 3 is also formed with a similar port or opening $b^5$, adapted to pass over the port in plate 2 at each revolution of the shaft on which it is mounted and thus intermittingly control communication between chamber B' and B².

Head C is cored out to form a chamber $c$ which surrounds a central strut $c^9$ through which the bearing for the central shaft extends. A port $c'$ leads from said chamber to discharge through the exhaust valve and out through the exhaust channel, or port $a$ in the casing A. Ports $c^5$ and $c^6$ lead from chambers in which rotors D and D' operate into said chamber $c$. An exhaust valve C' for controlling the exhaust from said chamber is mounted in a horizontal bore in the lower part of the head C with which the port $c'$ communicates. Said exhaust valve consists of a hollow cylinder having an opening in one side and closed around its other sides and with one end open and communicating with the exhaust port $a$ in casing A. Its opposite end is closed and is mounted on the inner end of a shaft 8 carrying a gear wheel 9, by which it is operated, as will be presently described. A fan $C^2$ is also mounted on said shaft 8 with its blades extending into a circumferential recess which communicates with the cooling channels $a'$ surrounding the bores in the casing A. An air duct $c^2$ leads from the chamber surrounding the fan to the outside and an outlet $a^4$ is provided for said cooling channel at the opposite side of casing A.

The rotors D and D' are mounted on shafts 10 and 11, respectively, which are journaled in suitable bearings in the heads B and C. The bearings are preferably of the form best shown in Fig. 1, and fully shown and described in my Patent No. 960,990. The rotor D is formed with radially extending vanes $d$ on diametrically opposite sides and the rotor D' is formed with similar vanes $d'$ arranged in like manner.

The central rotor E is mounted on a shaft 12 journaled in suitable bearings in the heads B and C and is formed with longitudinal grooves on diametrically opposite sides of a form corresponding to the form of the vanes of the rotors D and D' and adapted to intermesh therewith.

Packing strips $d^2$ are mounted in the crowns of the vanes of the rotor D and similar packing strips $d^3$ in the crowns of the vanes of the rotor D'. Said packing strips are T-shaped in cross section and mounted in correspondingly shaped grooves, being forced outwardly into contact with the interior wall of the chamber containing the rotor by means of springs, as indicated in dotted lines in Fig. 4. Similar packing strips $e$ are mounted in similar longitudinal grooves on each side of each of the grooves in said central rotor E.

It will be noted, by reference to Fig. 4 particularly, that the several rotors are of the same diameter and mounted on shafts journaled in bearings in the same horizontal plane, the bores in which the side rotors are mounted being of a diameter that much larger than the diameter of the central bore as will equal the projection of the vanes on the sides of said side rotors, said side bores intersecting the central bore so that said vanes project into and engage with the longitudinal grooves in the central rotor as the several rotors revolve.

The rear ends of each of the shafts 10, 11 and 12 project through the head C into a gear casing $C^3$ and have gear wheels 13, 14 and 15 mounted thereon which intermesh and thus insure that said rotors will rotate together. Another gear wheel 16 on the outer end of central shaft 12 meshes with the gear wheel 9 on the shaft 8 of the exhaust valve for rotating it and a fan $C^2$ is also mounted on said shaft 8. At the opposite end the shafts 10 and 11 of the side rotors project through the head B and are provided with cranks 17 and 18 on their outer ends. A central crank-shaft 19 is journaled in line with central shaft 12, in bearings in the head B, and in the outer side of a gear casing $B^3$, which is attached to said head and incloses said cranks. Said crank-shaft 19 is provided with a crank 20 and said cranks 17, 18 and 20 are connected to each other by a pitman 21 to operate together. On the end of crank-shaft 19 is mounted a pulley 22, which may be connected by a belt to any mechanism, or power shaft, which it is desired to drive. A crank pin 23, preferably of a common "disappearing" type, is provided on the crank wheel 22 for use in starting the engine, as will be presently described.

The pipe 7, as before stated, leads to the carbureter, or charge mixer, and is adapted to discharge into the chamber B' and is provided with a check valve 25 adjacent to the point where it is joined to the head B, which will prevent any backward flow from said chamber B'. A by-pass pipe 26 connects chamber B² in head B with the chamber $c$ in the head C. A check valve 27 adjacent to head B prevents any backward flow from chamber B² and a similar check valve 28 will prevent any flow of fluid from chamber $c$ to chamber B² unless under pressure. An electric spark-plug 30 is provided in chamber B² suitably connected and controlled by an interrupter, or "timer" 31 of any approved construction, (shown particularly in Fig. 7 located on any portion of the machine desired, but shown supported on a bracket on the outside of gear casing $C^3$, and operated by the shaft 8 carrying the exhaust valve $C'$ and fan $C^2$, which shaft rotates the required speed to govern the sparking.

The operation is a follows: The engine is started by turning the fly-wheel 22 by means of the crank handle 23 (shown extended in Fig. 1). As the rotors are turned the gas mixture is drawn by suction from the carbureter through pipe 7 into the chamber $B'$ and through the ports $b$ and $b'$ into the chambers surrounding the rotors $D$ and $D'$. As the charge is drawn into the chambers between the vanes of the rotors $D$ and $D'$ and said rotors revolve, said charge is compressed between the vanes and the side of the central rotor $E$ until it is forced out into the chamber $c$ in the head $C$ and through the by-pass 26, under pressure, which will open check valve 28, into the firing chamber $B^2$. During this operation the exhaust valve $C'$ is closed and communication through the plates 1, 2 and 3 is cut off by the position of the outside plate 3. After one charge has been compressed in the firing chamber $B^2$ a spark is caused by the spark-plug 30, which fires the charge just as plate 3 is uncovering the port through the plates 1 and 2 and the gas is beginning to pass into chamber $B'$ and through the "heel" portions of ports $b$ and $b'$ to behind the vanes of the side rotors. The explosion thus takes place chiefly in chamber $B^2$, but also in part in chamber $B'$ and behind the vanes of the rotors the expanding gas passing through chamber $B'$ and from chamber $B'$ through the ports $b$ and $b'$ to behind the vanes of the rotors $D$ and $D'$, which have just discharged the compressed mixture from the chamber $c$. The expansion of the gases behind said vanes forces the rotors around and the spent gases are discharged into chamber $c$. The exhaust valve $C'$ being at this time open said gases pass out through the exhaust port $a$ and at the next revolution another charge of gas is drawn in and compressed in the same manner as before and forced through by-pass 26 into chamber $B^2$ during the period that the exhaust valve $C'$ and the passage through the plates 1, 2 and 3 are closed. The spark and explosion take place again just after the port $b^5$ in plate 3 has begun to uncover the ports $b^4$ and $b^3$ in the plates 2 and 1, when said explosion and expansion of the gases behind the vanes of the rotors gives them a further rotary impetus, carrying them for another revolution and operating as before to expel the burnt charge through the exhaust port $a$, and while the ports are closed to draw in another charge from the pipe 7' and compress the same into chamber $B^2$. It will be noticed that the expansion of the gas is utilized for the driving power and also the force of the explosion, which takes place in the firing chamber $B^2$ and in the groove of the center rotor and that the force of expansion is directed against each rotor in opposite directions so that the strain upon the different parts of the engine is equalized and balanced and the vibration neutralized. It will also be seen that by connecting the several rotors with gears at one end and the two side rotors at the other end by gears, or cranks, as shown, the load of the engine is thrown upon the cranks and the gears can be made comparatively light as they are only required to drive the center rotor.

Having thus fully described my said invention, what I claim as new and desire to secure by Letters Patent, is:

1. A rotary gas engine comprising a suitable casing, a series of rotors mounted in chambers therein and formed with intermeshing pistons and grooves, a part at one end of said casing having a combustion chamber and a receiving chamber for the charge which latter chamber is connected to the chambers containing said rotors by suitable ports, igniting means within said combustion chamber, gas supply means, valve mechanism for controlling the inflow of the charge of gas, a part at the opposite end of said casing having a chamber also connected by ports with the chambers containing the rotors and by another port with the exhaust port and by a by-pass with the combustion chamber at the opposite end of the engine, an exhaust valve in the exhaust port for regulating the exhaust, and a valve in said by-pass for controlling passage therethrough, substantially as set forth.

2. A rotary gas engine comprising a casing, a series of rotors mounted in appropriate chambers therein, a head at one end of said casing formed with a multiple of charge receiving chambers connected by a communicating passage, firing means in one of said chambers, valves for controlling the passage between said chambers, a head at the opposite end of said casing formed with a combined gas receiving and exhaust chamber communicating with the chambers containing the rotors and with the exhaust and with the initial charge receiving chamber, and valves for controlling the handling of the exhaust and the charges from said combined gas receiving and exhaust chamber alternately, substantially as set forth.

3. A rotary gas engine comprising a casing, a series of rotors mounted in suitable chambers therein and provided with intermeshing pistons and grooves, gearing connecting said rotors, a head on one end of said casing containing a charge receiving chamber communicating with the chambers containing the rotors, and a combustion chamber separated from said receiving chamber by parts having ports therethrough, a valve plate for controlling said ports, a head at the opposite end of said casing having an exhaust chamber communicating with the chambers containing the rotors, a bypass leading from said charge receiving chamber to the combustion chamber in the outer end of the opposite head, a rotary exhaust valve controlling a port leading to the outside from said chamber, and a sparker in the combustion chamber, substantially as set forth.

4. A rotary gas engine comprising a casing, a series of rotors mounted in suitable chambers therein and provided with pistons and grooves adapted to inter-mesh during rotation, a head at one end of said casing provided with chambers to receive the charge provided with appropriate inlets and outlets, valves for controlling the inlets and outlets to said chambers, a head at the other end of the casing having a chamber communicating with the exhaust and with the charge receiving chamber, both of said heads being formed with ports leading from the chambers therein to the chambers containing the rotors, valves for controlling the exhaust and compression, and firing mechanism, substantially as set forth.

5. A rotary gas engine comprising a casing, a series of rotors mounted in longitudinal bores therein with their axes in the same plane, the center rotor being formed with two longitudinal grooves in diametrically opposite sides and the side rotors each being formed with two pistons adapted to mesh therewith, a head on one end of said casing formed with a charge receiving chamber communicating through suitable ports with chambers in said casing between the pistons of the respective side rotors at diagonally opposite sides, a supply pipe leading to said charge chamber, a combustion receiving chamber in said head separated from the charge receiving chamber by valve mechanism, said valve mechanism, sparking means communicating with said combustion chamber, a head on the opposite end of said casing formed with an exhaust chamber also communicating with the chambers in the casing surrounding the side rotors at diagonally opposite sides and oppositely disposed to the ports at the opposite end, a by-pass leading from said exhaust chamber to said charge receiving chamber, an exhaust port leading from said exhaust chamber, and means for controlling the operation of the several valves to properly time the compression, the exhaust and the explosion, substantially as set forth.

6. A rotary gas engine comprising a casing, a series of rotors formed part with pistons and part with grooves and arranged alternately to inter-mesh and adapted to rotate in chambers formed in said casing, a head at each end of said casing formed with chambers arranged to communicate through appropriate ports with the chambers in said casing surrounding said rotors, a gas inlet pipe leading into one of said chambers in one head, which head also has an explosion chamber communicating with said other chamber therein, valve mechanism for controlling said communication, the chamber in the opposite head being provided with outlets and connected to communicate with said explosion chamber and said opposite head having an exhaust port also in communication with its said chamber, valve mechanism for controlling the outlets from said chamber, and means for operating said valve mechanism arranged to appropriately time the compression of the charge, the firing thereof, and the exhaust of the spent gases, substantially as set forth.

7. A rotary gas engine comprising a casing, a series of rotors alternately arranged and formed one with pistons and the next with grooves, and adapted to inter-mesh during their rotation and mounted in chambers in said casing, a head on each end of said casing, one of said heads containing a receiving and an explosion chamber and the other a compression and exhaust receiving chamber, suitable ports being provided in the structure for connecting said several chambers, valves for controlling said ports, and means for operating said valves, substantially as set forth.

8. A rotary gas engine comprising a casing, rotors mounted in chambers therein formed one with pistons and the next with grooves alternately arranged and adapted to inter-mesh, heads on said casing containing receiving, firing, and exhaust chambers, and appropriate ports for communication between them, valves for controlling the ports, a channel surrounding the chambers in said casing containing said rotors, a fan for forcing air through said channel, and means for operating said valves and said fan, substantially as set forth.

9. A rotary gas engine comprising a casing, rotors mounted in said casing formed with pistons and grooves adapted to inter-mesh, heads on said casing, the one at one end having a receiving chamber and an explosion chamber connected therewith and the other at the other end having a compression and exhaust receiving chamber, a charge supply pipe communicating with said receiving chamber in said first head, appropriate valves and ports for connecting said chambers and controlling the operation of the engine, and means for operating the valves, substantially as set forth.

10. A rotary engine comprising a casing with suitable inlet and exhaust ports, a series of not less than three rotors arranged with an intermediate rotor formed with grooves and the rotors on each side thereof having pistons in the form of radial vanes adapted to mesh with said grooves, valves for controlling said ports, gearing connecting the shafts of the several rotors at one end whereby they are compelled to rotate in harmony to insure accurate coöperation, and crank-and-link mechanism connecting the shafts of the piston rotors only with the load whereby said piston rotors are required to rotate in accurate unison, substantially as set forth.

In witness whereof, I, have hereunto set my hand and seal at Greensburg, Pennsylvania, this 15th day of September, A. D. nineteen hundred and ten.

NEWELL H. MOTSINGER. [L. s.]

Witnesses:
HARRY E. BLANK,
THOS. WASHABAUGH.

Copies of this patent may be obtained for five cents each, by addressing the "Commissioner of Patents, Washington, D. C."